(12) United States Patent
Jaspers

(10) Patent No.: US 8,952,287 B2
(45) Date of Patent: Feb. 10, 2015

(54) APPARATUS FOR SUPPORTING WORKPIECES FOR WELDING

(75) Inventor: Jorge Jaspers, Morsbach (DE)

(73) Assignee: IBS Filtran Kunststoff-/Metallerzeugnisse GmbH, Morsbach (DE)

( * ) Notice: Subject to any disclaimer, the term of this patent is extended or adjusted under 35 U.S.C. 154(b) by 298 days.

(21) Appl. No.: 13/091,340

(22) Filed: Apr. 21, 2011

(65) Prior Publication Data

US 2011/0253684 A1    Oct. 20, 2011

Related U.S. Application Data

(63) Continuation of application No. PCT/EP2009/007512, filed on Oct. 20, 2009.

(51) Int. Cl.
*B23K 26/21* (2014.01)
*B23K 37/04* (2006.01)
*B23K 26/02* (2014.01)
*B23K 26/24* (2014.01)

(52) U.S. Cl.
CPC .......... *B23K 26/023* (2013.01); *B23K 37/0426* (2013.01); *B23K 26/246* (2013.01)
USPC ...... 219/121.64; 219/158; 219/161; 228/44.7

(58) Field of Classification Search
USPC .......... 219/121.63, 121.64, 158, 161; 269/37, 269/40, 45, 43, 44, 55; 228/44.3
See application file for complete search history.

(56) References Cited

U.S. PATENT DOCUMENTS

| | | | | |
|---|---|---|---|---|
| 1,167,418 A | * | 1/1916 | Lennon | 29/283 |
| 1,550,651 A | * | 8/1925 | Charter | 219/161 |
| 4,461,946 A | * | 7/1984 | Kratschmer | 219/121.63 |
| 4,617,446 A | * | 10/1986 | Anderson | 219/121.63 |
| 5,064,991 A | * | 11/1991 | Alborante | 219/121.63 |
| 5,324,913 A | * | 6/1994 | Oberg et al. | 219/121.63 |
| 5,616,261 A | * | 4/1997 | Forrest | 219/121.63 |
| 5,910,894 A | * | 6/1999 | Pryor | 219/121.64 |
| 6,590,180 B1 | * | 7/2003 | Suh et al. | 219/121.63 |
| 6,713,712 B1 | * | 3/2004 | Wildmann et al. | 219/121.63 |
| 2002/0121506 A1 | * | 9/2002 | Menin | 219/121.64 |

(Continued)

FOREIGN PATENT DOCUMENTS

CN    1951674 A    4/2007
DE    19623664 C1    10/1997

(Continued)

OTHER PUBLICATIONS

Machine translation of European Patent document No. 1,336,447, Jan. 2013.*
International Search Report dated Feb. 9, 2010.

*Primary Examiner* — Geoffrey S Evans
(74) *Attorney, Agent, or Firm* — Loza & Loza, LLP; Leo J. Jennings

(57) ABSTRACT

A laser welding tool comprises a first and a second tool part for fixing a first welding article to a second welding article. The two welding articles are arranged at least partially between the two tool parts. The second tool part comprises at least two partial elements which are displaceable independently of one another toward the first tool part for pressing the second welding article against the first welding article.

7 Claims, 3 Drawing Sheets

(56) References Cited

U.S. PATENT DOCUMENTS

| | | |
|---|---|---|
| 2004/0065406 A1* | 4/2004 | Chen et al. .................. 156/272.8 |
| 2006/0027541 A1* | 2/2006 | Sun et al. .................. 219/121.63 |
| 2006/0054611 A1 | 3/2006 | Stol et al. |
| 2007/0007253 A1* | 1/2007 | Wang et al. .................. 219/86.25 |
| 2007/0084552 A1* | 4/2007 | Watanabe et al. .......... 156/272.8 |
| 2008/0040926 A1* | 2/2008 | Kismarton et al. ......... 29/897.35 |
| 2009/0278294 A1* | 11/2009 | Wang et al. .................. 269/287 |

FOREIGN PATENT DOCUMENTS

| | | |
|---|---|---|
| DE | 19860357 A1 | 4/2000 |
| EP | 985485 A1 * | 3/2000 |
| EP | 1336447 A1 | 8/2003 |
| EP | 1336447 A1 * | 8/2003 |
| EP | 1384550 A1 | 1/2004 |
| JP | 2001162388 A | 6/2001 |
| JP | 2004025219 A | 1/2004 |

\* cited by examiner

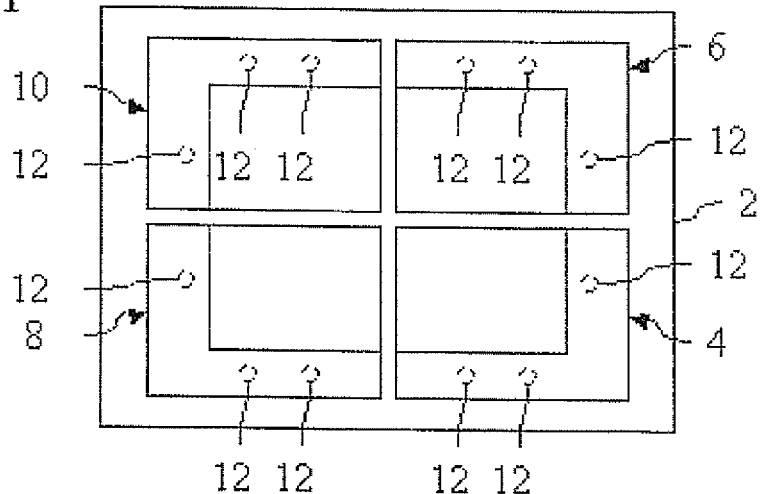
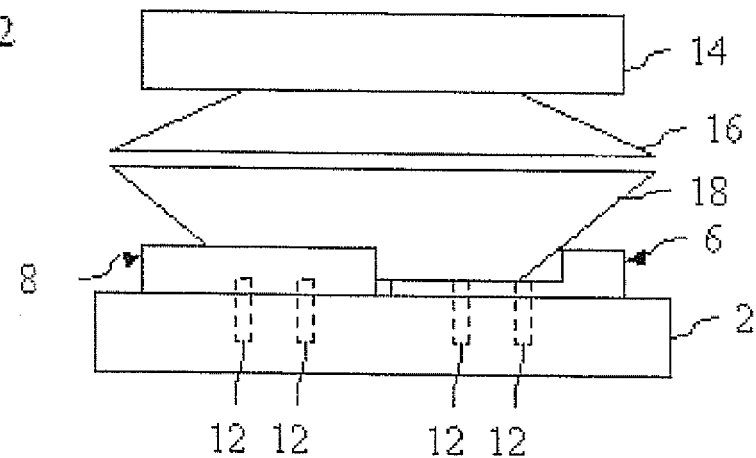
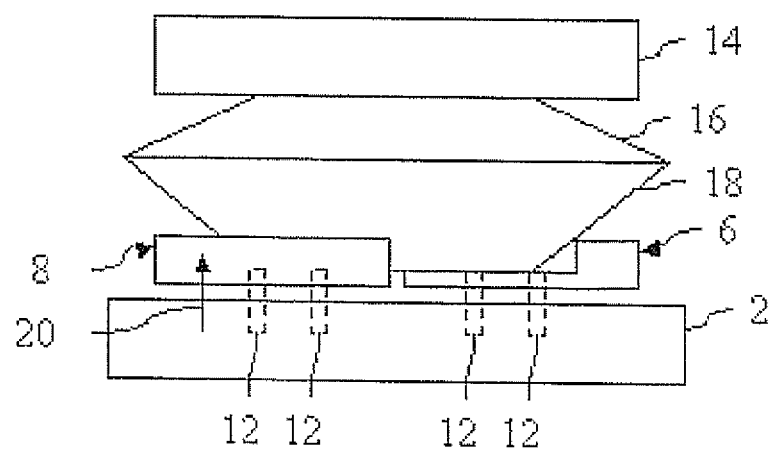

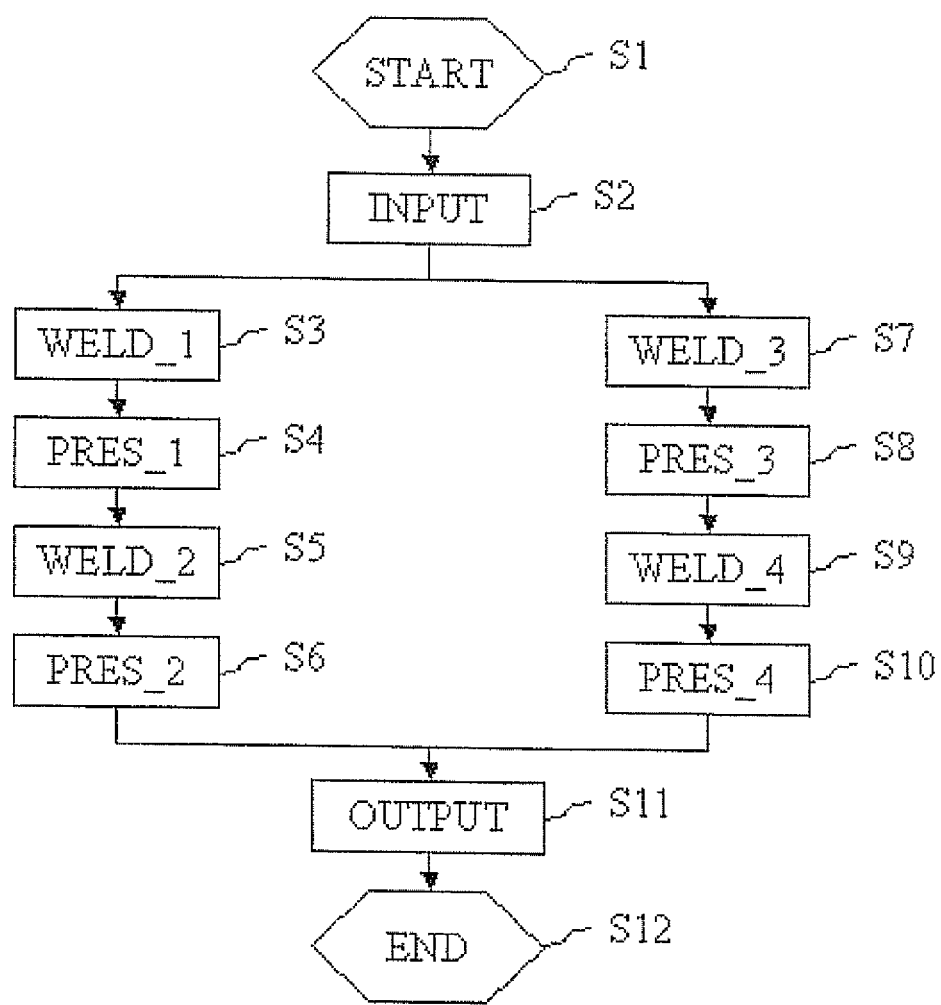

APPARATUS FOR SUPPORTING WORKPIECES FOR WELDING

PRIORITY

This application claims priority to PCT Application No. PCT/EP2009/007512, filed on Oct. 20, 2009, and published as WO2010/046089 A1, and to German Patent Application No. 10-2008-052489.1, filed on Oct. 21, 2008, the entire disclosures all of which are hereby incorporated by reference.

FIELD OF INVENTION

The invention relates to a laser welding tool comprising a first and a second tool part for fixing a first welding article to a second welding article. The first welding article and the second welding article here are arranged at least partially between the two tool parts.

BACKGROUND OF INVENTION

DE 198 60 357 B4 discloses a laser welding method for automatic transmission oil filters. Here, two plastic filter half-shells arranged between an upper tool and a lower tool are connected by laser welding to produce an automatic transmission oil filter. A filter medium is clamped between the two filter half-shells by means of a clamping rib. The filter half-shells, which lie on one another, are welded over their common edge by laser light. One of the filter half-shells consists of plastic which transmits laser light and the other filter half-shell consists of plastic which is opaque to laser light. The laser beam is guided through the filter half-shell which transmits laser light along the point of contact with the other filter half-shell. In the process, it strikes the filter half-shell which is opaque to laser light. As a result of the light absorption of the plastic material which is opaque to laser light, the two filter half-shells are fused to one another in the welding region. However, the edges to be welded are incompletely pressed against one another at the circumference, since the rigid design of the welding tools known to date means that contour deviations at the welding regions cannot be compensated for.

SUMMARY OF INVENTION

It is an object of the present invention to provide a laser welding tool, an arrangement for welding two welding articles and a method for operating the arrangement, which makes an effective contribution to a particularly precise and uniform weld seam.

According to a first aspect of the invention, the object is achieved by a laser welding tool comprising a first and a second tool part. The first and second tool parts are provided for fixing a first welding article to a second welding article. The second tool part comprises at least two partial elements which are displaceable independently of one another toward the first tool part for pressing the second welding article against the first welding article.

The two partial elements which are displaceable independently of one another make it possible to press the two tool parts against one another in segments. In particular, an increased pressure can be built up wherever a laser has just produced a weld seam, which is still hot and flexible. This can make a particularly effective contribution to the cooled and hard weld seam being particularly uniform and precise. Here, the pressure can be varied continuously or gradually.

In an advantageous configuration, the partial elements are automatically displaceable. This makes particularly precise displacement of the partial elements possible, for example by an electronic control apparatus.

In this context, it is particularly advantageous if each partial element is coupled to at least one adjusting unit for automatically displacing the corresponding partial element. Here, the adjusting units are preferably adjusted pneumatically, hydraulically, electrically or by spring force. This makes it possible to automatically displace the partial elements in a simple manner.

In a further advantageous configuration, the second tool part comprises three or more partial elements which are displaceable toward the first tool part for pressing the second welding article against the first welding article. This makes it possible to exert the pressure more precisely along the fresh weld seams on a plurality of different segments of the two welding articles, and can thus contribute to the weld seam having a particularly uniform form, in particular if a plurality of lasers are used for welding.

According to a second aspect of the invention, the invention is distinguished by an arrangement for welding two welding articles, comprising at least one laser, the laser welding tool and comprising the control apparatus. The control apparatus is coupled to the laser and the laser welding tool and is designed such as to make it possible for the partial elements of the laser welding tool to be displaced depending on a position of the laser.

In an advantageous configuration, the arrangement comprises two or more lasers which are respectively assigned permanently to one or more partial elements. This can contribute to the particularly precise and rapid production of the weld seams.

According to a third aspect of the invention, the invention is distinguished by a method for operating the arrangement. Here, the two welding articles are placed on one another in the first or second tool part. Alternatively, the first welding article can be fixed to the first tool part and the second welding article can be fixed to the second tool part. The partial elements of the second tool part are then displaced toward the first tool part, or the first tool part is displaced toward the second tool part, such that the two welding articles can be welded to one another. Consequently, the laser is used to weld first segments of the two welding articles. The first segments are arranged between the first partial element and the first tool part in the direction of movement of the first partial element. Immediately after the two segments have been welded, the first partial element is displaced toward the first tool part and the two welding articles are thus pressed against one another at their first segments. The laser is furthermore used to weld second segments of the two welding articles, wherein the second segments are arranged between the second partial element and the first tool part in the direction of movement of the second partial element. Immediately after the two segments have been welded, the second partial element is displaced toward the first tool part and the two welding articles are thus pressed against one another at their second segments. This contributes to the particularly precise and uniform formation of the weld seams, since the segments are pressed against one another whenever the weld seams are still hot and flexible and a relative movement of the two welding articles in relation to one another is still possible. The same contact pressure is therefore always produced uniformly at almost always identical temperatures of the weld seams. Here, the contact pressure can be increased gradually or continuously and/or be varied during the pressing.

In an advantageous configuration of the method, more than two partial elements are provided, and the partial elements are displaced toward the first tool part whenever the corresponding segments of the two welding articles have been welded. This can make a particularly effective contribution to the production of the uniform weld seams, particularly if the welding articles are large and subdivision into a plurality of segments is reasonable and/or if a plurality of lasers are provided.

In this context, it is particularly advantageous if different segments of the welding articles are welded at the same time or at different points in time using different lasers assigned to the corresponding segments. The partial elements are then displaced toward the first tool part when the corresponding segments have been welded, in particular have been freshly welded. By way of example, a laser can be assigned to each partial element. Alternatively, a separate laser can be assigned respectively to two or more partial elements. Particularly in the case of especially large welding articles, this can contribute to the particularly uniform and precise formation of the weld seam.

BRIEF DESCRIPTION OF THE DRAWINGS

Exemplary embodiments of the invention are explained in more detail below with reference to schematic drawings, in which:

FIG. 1 is a plan view of a tool part of a laser welding tool,

FIG. 2 is a first side view of the laser welding tool with two welding articles, FIG. 3 is a second view of the laser welding tool with the two welding articles, FIG. 6 is a flow chart of a program for operating a laser welding arrangement.

DETAILED DESCRIPTION

Figure 4:
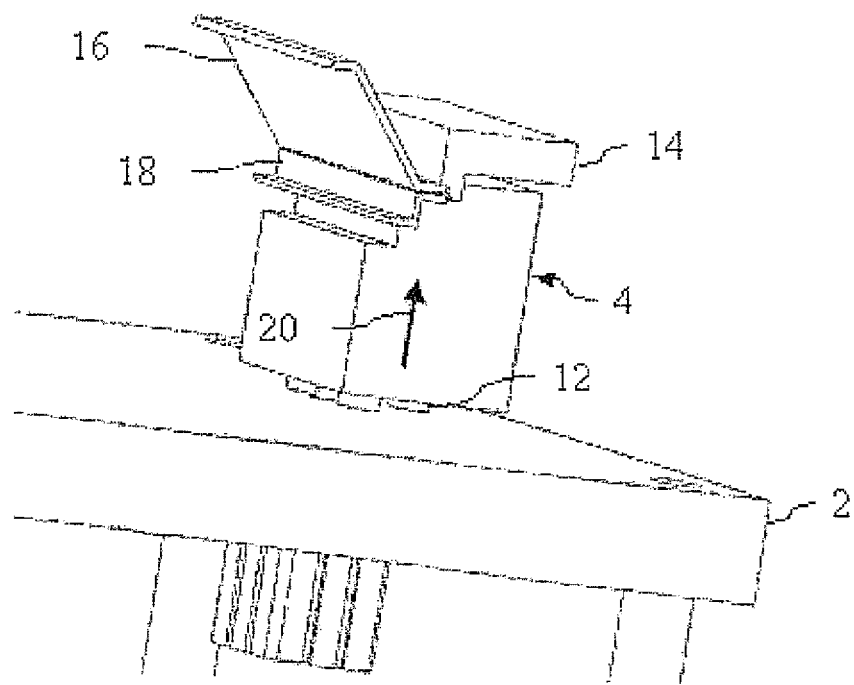
FIG. 4 is a detailed view of a second embodiment of the laser welding tool.

Elements having the same design or function are denoted by the same reference signs throughout the figures.

A laser welding tool comprises a first tool part 14 and a second tool part 2 (FIG. 1, FIG. 2). The second tool part 2 comprises at least two, preferably more, partial elements 4, 6, 8, 10 which are displaceable independently of one another. A plurality of adjusting units 12 are preferably provided for displacing the partial elements 4, 6, 8, 10, and these adjusting units make it possible for the partial elements 4, 6, 8, 10 to be displaced independently of one another.

The partial elements 4, 6, 8, 10 preferably have a form which is at least partially formed depending on welding articles 16, 18 to be welded, such that they can receive and hold the welding articles 16, 18 without damaging them. By way of example, the partial elements 4, 6, 8, 10 may be raised in their edge regions and be flattened toward a common central point.

The first tool part 14 preferably has a single-piece design and likewise has a form which is at least partially negative with respect to the first welding article 16, in which case the second welding article 18 then defines the form of the partial elements 4, 6, 8, 10.

In a particularly simple configuration, the two welding articles 16, 18 can simply be placed on one another and together onto the partial elements 4, 6, 8, 10. The first tool part 14 can then be moved toward the second tool part 2, such that the first tool part 14 constitutes at least an abutment for building up a counterpressure. Alternatively, the first tool part 14 may be fixed in place and the second tool part 2 is movable toward the first tool part 14. Alternatively, the first and second tool parts 14, 2 can be fixed and only the partial elements 4, 6, 8, 10 are movable toward the first tool part 14, in order to apply pressure to the two welding articles 16, 18 in a coupling region. Furthermore, it is possible to provide apparatuses for fixing the welding articles 16, 18 to the tool parts 14, 2. By way of example, the first tool part 14 may comprise a negative-pressure apparatus, via which the first welding article 16 can be fixed to, in particular sucked onto, the first tool part 14. Furthermore, the second tool part 2 can also comprise such an apparatus for fixing the second welding article 18 to the displaceable partial elements 4, 6, 8, 10.

In addition to the laser welding tool, an arrangement for welding the two welding articles 16, 18 comprises at least one laser 19, which makes it possible for the two welding articles 16, 18 to be welded in their coupling region by means of a laser beam 21. Here, a particularly uniform and precise weld seam is obtained by virtue of the fact that displacement of the displaceable partial elements 4, 6, 8, 10 toward the first tool part 14 always exerts a predefined contact pressure on the two welding articles 16, 18 whenever the laser beam 21 has just passed over a corresponding segment of the two welding articles 16, 18. In addition to the laser 19, it is possible to provide further lasers, and these are then preferably assigned to predefined segments of the welding articles 16, 18 and corresponding displaceable partial elements 4, 6, 8, 10.

In a second embodiment of the laser welding tool (FIG. 4), merely an edge of the two welding articles 16, 18 is pressed together by means of the first tool part 14 and the displaceable partial elements 4 to 8. Here, the movement of the displaceable partial elements 4, 6, 8, 10 is along a direction 20 directed toward the first tool part 14. In this context, specifically the partial regions of the two welding articles 16, 18 arranged between the first tool part 14 and one of the partial elements 4 in the direction 20 are referred to as individual segments of the two welding articles 16, 18.

Figure 5:
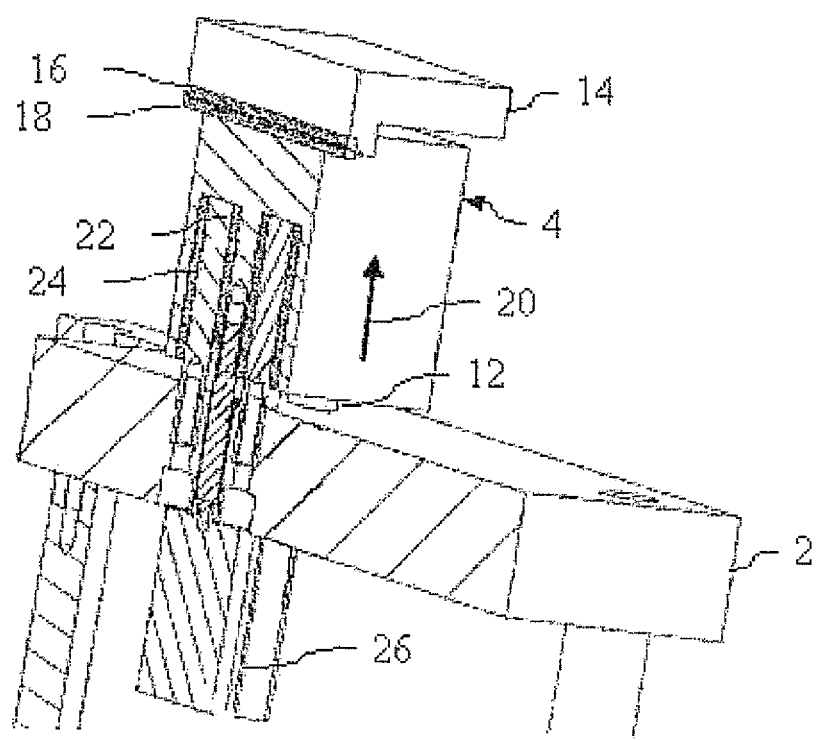
FIG. 5 is a sectional view through the second embodiment of the laser welding tool.

By way of example, the adjusting units 12 may comprise guide bodies 22 (FIG. 5), in particular guide columns, and/or guide bushes 24 on the guide bodies 22. Furthermore, it is preferable for each adjusting unit 12 to be assigned an adjusting drive 26, which makes it possible, via a central pin for example, for the corresponding partial element 4 to be displaced. The cylinder 26 displaces the partial element 4 in the direction of the arrow 20 via a connection element. The partial element 4 is mounted on the guide columns. The guide bushes 24, in particular bearing bushes, in which the guide columns slide are incorporated permanently in the segment.

A program (FIG. 6) for operating the arrangement comprising the laser 19 and the laser welding tool is preferably stored on a control device (not shown). The program is preferably started in a step S1, in which variables are initialized if appropriate.

If the two welding articles 16, 18 are inserted into the laser welding tool mechanically, it is possible to initiate the insertion of the two welding articles 16, 18 into the laser welding tool in a step S2 with an insertion command INPUT, for example. Alternatively, the two welding articles 16, 18 can be disposed in the laser welding tool manually.

In a step S3, the laser 19 is moved to the start of the two welding articles 16, 18 by means of a first welding instruction WELD_1 and during the welding is guided along a desired weld seam on first segments of the two welding articles 16, 18.

In a step S4, the partial element 4, 6, 8, 10 is displaced toward the first tool part 14 by means of a first pressing instruction PRES_1 such that the first segments of the two welding articles 16, 18 which have just been welded are pressed against one another in the region of the weld seam. Here, the contact pressure can simply be increased or the contact pressure can be increased over a plurality of stages or the contact pressure can be varied continuously, for example depending on a temperature of the weld seam.

In a step S5, the laser 19 is moved to the start of second segments of the two welding articles 16, 18 by means of a second welding instruction WELD_2, wherein the first segments can merge seamlessly into the second segments, such that a continuous weld seam is produced at the transition from the first segments to the second segments. Furthermore, the second segments of the two welding articles 16, 18 are welded using the laser beam 21 in the step S5.

In a step S6, pressure is exerted on the freshly welded second segments of the two welding articles 16, 18 by means of a second pressing instruction PRES_2 as per the step S4.

In the steps S7 to S10, as per the steps S3 to S6, third and fourth welding instructions WELD_3, WELD_4 and third and fourth pressing instructions PRES_3 and PRES_4 can initiate the welding and pressing together of third and fourth segments of the two welding articles 16, 18. Here, the steps S7 to S10 can be executed at the same time as the steps S3 to S6 or after the steps S3 to S6. Furthermore, a further laser may be provided for welding the third and fourth segments.

If the two welding articles 16, 18 are removed from the laser welding tool mechanically, this removal operation can be initiated by means of a removal command OUTPUT, for example.

In a step S12, the program can be ended. However, after the step S11, the program is preferably executed again in the step S2 with new welding articles 16, 18.

The invention is not restricted to the exemplary embodiments indicated. In particular, the laser welding tool may comprise only two, three or more than four partial elements 4, 6, 8, 10, which are then displaced quite independently or at least partially at the same time in order to exert the contact pressure on the two welding articles 16, 18. Furthermore, the welding process may be subdivided into stages. By way of example, these stages comprise pressing, welding, holding and/or further stages. These stages can then be assigned different contact pressures and/or pressing times.

What is claimed is:

1. An apparatus for supporting a first article and a second article to be laser welded to each other, the apparatus comprising:
   a single-piece first tool part adapted to contact the first article;
   a second tool part; and
   a first partial element and a second partial element movably mounted to the second tool part, each partial element opposed to the first tool part and adapted to independently move relative to the second tool part toward the first tool part and to each contact the second article and press the second article and the first article together,
   wherein the first tool part is movable relative to the second tool part in a first direction.

2. The apparatus of claim 1, further comprising:
   a first adjusting unit that moves the first partial element relative to the second tool part; and
   a second adjusting unit that moves the second partial element relative to the second tool part.

3. The apparatus of claim 1, wherein the first partial element and the second partial element each move in a second direction.

4. The apparatus of claim 3, wherein the second direction is parallel to the first direction.

5. The apparatus of claim 1, wherein the second tool part is movable relative to the first tool part in the first direction.

6. The apparatus of claim 5, wherein the first partial element and the second partial element each move in a second direction.

7. The apparatus of claim 6, wherein the second direction is parallel to the first direction.

* * * * *